(12) United States Patent
Bobert et al.

(10) Patent No.: US 10,749,316 B2
(45) Date of Patent: Aug. 18, 2020

(54) MULTIPLE SPARK-GAP ARRESTER

(71) Applicant: EPCOS AG, München (DE)

(72) Inventors: Peter Bobert, Falkensee (DE); Eduard Dorsch, Dallgow (DE); Frank Werner, Berlin (DE)

(73) Assignee: EPCOS AG, Munich (DE)

( * ) Notice: Subject to any disclaimer, the term of this patent is extended or adjusted under 35 U.S.C. 154(b) by 381 days.

(21) Appl. No.: 15/743,257

(22) PCT Filed: Aug. 17, 2016

(86) PCT No.: PCT/EP2016/069537
§ 371 (c)(1),
(2) Date: Jan. 9, 2018

(87) PCT Pub. No.: WO2017/036803
PCT Pub. Date: Mar. 9, 2017

(65) Prior Publication Data
US 2018/0198260 A1 Jul. 12, 2018

(30) Foreign Application Priority Data
Aug. 31, 2015 (DE) .................. 10 2015 114 504

(51) Int. Cl.
H01T 4/20 (2006.01)
H01T 15/00 (2006.01)
(Continued)

(52) U.S. Cl.
CPC ................ *H01T 4/20* (2013.01); *H01T 4/16* (2013.01); *H01T 15/00* (2013.01); *H02H 9/043* (2013.01); *H02H 9/06* (2013.01)

(58) Field of Classification Search
CPC ..... H01L 2/00; H01L 2/02; H01L 4/16; H01L 4/20; H01L 15/00; H02H 9/043; H02H 9/06
See application file for complete search history.

(56) References Cited

U.S. PATENT DOCUMENTS 3,611,044 A    10/1971  Osterhout et al.
3,848,156 A *  11/1974  Tolstov .................... H02H 9/04
                                                            315/36

(Continued)

FOREIGN PATENT DOCUMENTS

CN           1467895 A      1/2004
CN         101061618 A     10/2007
(Continued)

*Primary Examiner* — Thienvu V Tran
*Assistant Examiner* — Christopher J Clark
(74) *Attorney, Agent, or Firm* — Slater Matsil, LLP

(57) ABSTRACT

A multiple spark-gap arrester is disclosed. In an embodiment the arrester includes a series connection of a plurality of spark gaps between a first potential node and a reference-ground potential node and a trigger circuit having an input and an output, the input being coupled to a second potential node between two adjacent spark gaps of the plurality of spark gaps, and the output being coupled to at least one of the spark gaps between the second potential node and the reference-ground potential node, wherein the trigger circuit is configured, when at least one spark gap between the first potential node and the second potential node is ignited, to supply a trigger signal for the at least one of the spark gaps between the second potential node and the reference-ground potential node.

15 Claims, 2 Drawing Sheets

(51) Int. Cl.
*H01T 4/16* (2006.01)
*H02H 9/04* (2006.01)
*H02H 9/06* (2006.01)

(56) References Cited

U.S. PATENT DOCUMENTS

| | | | | |
|---|---|---|---|---|
| 4,683,514 A | * | 7/1987 | Cook | H02H 9/06 361/111 |
| 4,890,180 A | * | 12/1989 | Paulsson | H02H 7/16 361/16 |
| 5,233,498 A | * | 8/1993 | Kansala | H01T 15/00 361/130 |
| 7,764,481 B2 | | 7/2010 | Kijima | |
| 8,508,326 B2 | | 8/2013 | Kang et al. | |
| 2009/0213504 A1 | * | 8/2009 | Hallstrom | H01T 15/00 361/16 |
| 2012/0112872 A1 | | 5/2012 | Kang et al. | |
| 2015/0288176 A1 | * | 10/2015 | Durth | H01C 7/10 361/91.2 |
| 2016/0204603 A1 | | 7/2016 | Bobert et al. | |

FOREIGN PATENT DOCUMENTS

| | | | | |
|---|---|---|---|---|
| CN | 102545196 A | | 7/2012 | |
| CN | 102986107 A | | 3/2013 | |
| DE | 19742302 A1 | | 4/1999 | |
| DE | 10114592 A1 | | 9/2002 | |
| DE | 10230827 A1 | | 2/2004 | |
| DE | 202013103823 U1 | | 9/2013 | |
| DE | 102013108658 A1 | | 2/2015 | |
| EP | 0905840 A1 | | 3/1999 | |
| EP | 1628377 A1 | | 2/2006 | |
| GB | 2376139 A | * | 12/2002 | H01T 4/16 |
| JP | S471924 A | | 1/1972 | |
| JP | S4964846 A | | 6/1974 | |
| WO | 2015018719 A1 | | 2/2015 | |

* cited by examiner

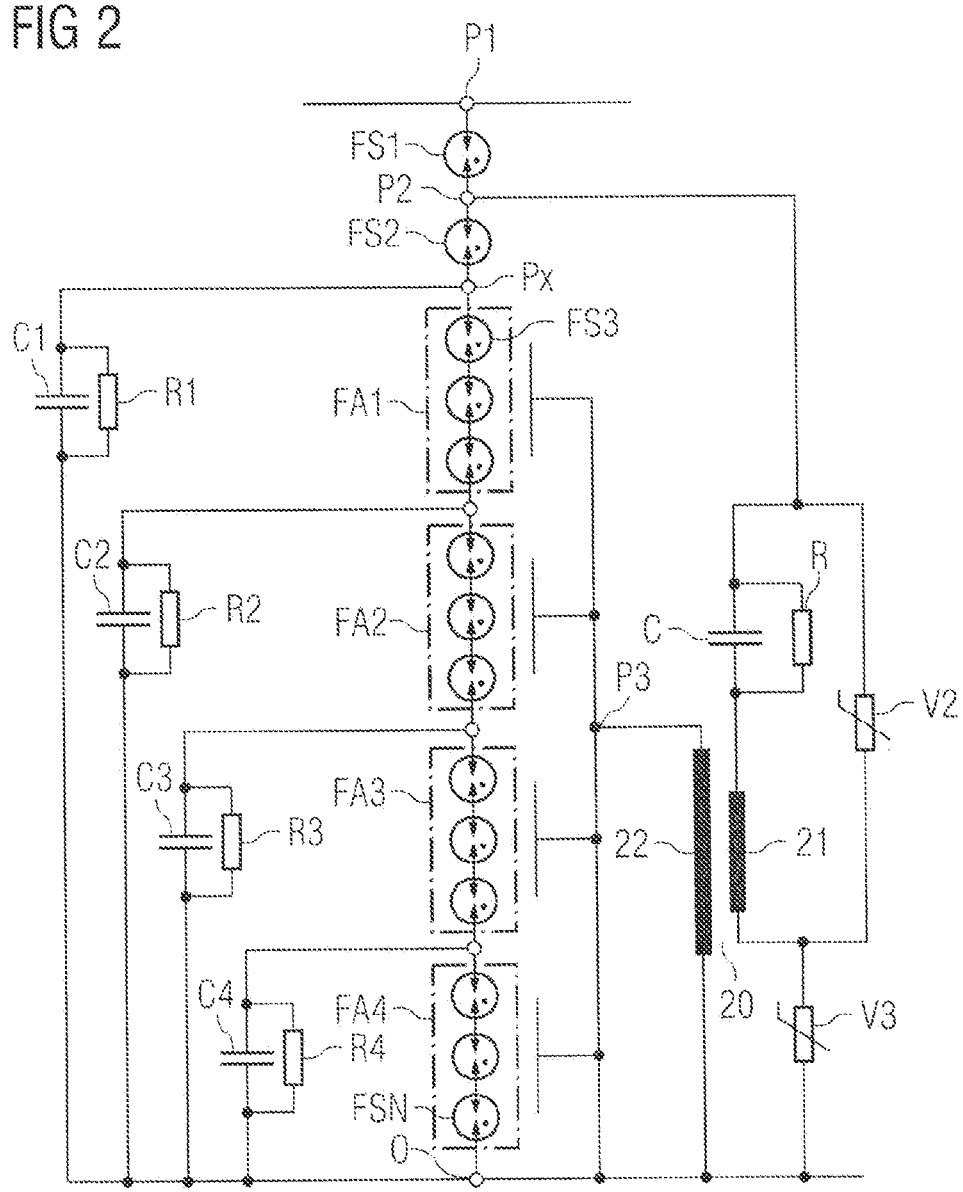

MULTIPLE SPARK-GAP ARRESTER

This patent application is a national phase filing under section 371 of PCT/EP2016/069537, filed Aug. 17, 2016, which claims the priority of German patent application 10 2015 114 504.9, filed Aug. 31, 2015, each of which is incorporated herein by reference in its entirety.

TECHNICAL FIELD

The invention relates to a multiple spark-gap arrester having a plurality of spark gaps connected in series for the purpose of overvoltage protection.

BACKGROUND

Spark gaps can be used to bleed off overvoltage peaks. A spark gap usually comprises a hollow body of insulating material, which forms a discharge space between two electrodes. If the voltage between the two electrodes increases to an ignition voltage, the electrodes are shorted by a spark. Spark gaps serving as arresters are overvoltage protection devices in which, after ignition, the short-circuit current bleeds off the voltage peak that arises.

However, in the case of DC voltage, the spark and the associated flow of current are not extinguished as soon as the voltage falls back below the overvoltage. This only happens when the voltage decreases to below the arc burning voltage of the spark gap, said arc burning voltage counteracting the applied DC voltage. When the voltage is below the arc burning voltage, the arc is quenched autonomously.

In order to increase the voltage at which the sparks in an overvoltage protection device are extinguished, it is possible to connect a plurality of spark gaps in series so that their arc burning voltages add up. However, the ignition voltage also increases as a result, said ignition voltage being required to ignite all the spark gaps. The ignition voltage at which the spark gaps of a series connection of N spark gaps ignite is approximately N times the ignition voltage of a spark gap multiplied by 0.7. This has the effect that the protection level of such a series connection of spark gaps is appropriately high. The aim, however, is a multiple spark-gap arrester having the lowest possible ignition voltage or the lowest possible ignition value, in the ideal case having the ignition voltage of a single spark gap.

To reduce the ignition value, previous approaches have interconnected each spark gap with a capacitor, for example, so that the increasing pulse voltage is gradually applied to each gap dynamically. Another approach is an auxiliary ignition gap arranged in parallel with the multiple spark gap, said auxiliary ignition gap providing an ignition transformer for each spark gap, for example. German Patent Application DE 102 30 827 A1 discloses triggering a multiple spark-gap arrester by means of a parallel auxiliary ignition gap.

SUMMARY OF THE INVENTION

Embodiments of the invention provide multiple spark-gap arrester. The multiple spark-gap arrester comprises a series connection of a plurality of spark gaps between a first potential node and a reference-ground potential node, as well as a trigger circuit having an input, which is coupled to a second potential node between two adjacent spark gaps, and an output, which is coupled to at least one of the spark gaps between the second potential node and the reference-ground potential node. The trigger circuit is configured, when the spark gaps between the first potential node and the second potential node are ignited, to supply a trigger signal for at least one of the spark gaps between the second potential node and the reference-ground potential node. The multiple spark-gap arrester uses a portion of the spark gaps, namely those between the first and the second potential node, to generate a trigger signal that ignites the other spark gaps. The trigger signal is advantageously a voltage pulse suitable for igniting the spark gaps between the first and second potential node by means of the series connection of the varistors.

In embodiments the trigger circuit comprises a transformer having a primary side, which is coupled to the input, and a secondary side, which is coupled to the output. The transformer serves as an ignition pulse transformer, which generates a high-voltage pulse from an input-side pulse. In one exemplary embodiment, the primary and secondary side each have a winding, by means of which the input-side signal is inductively transformed and amplified. In connection with this description, "coupling" comprises both the direct conductive connection of two components and the connection by means of one or more components connected in between.

The primary side is advantageously coupled in series with an RC element comprising a resistor connected in parallel with a capacitor. A varistor is advantageously coupled in parallel with the series connection by the primary side and the RC element. Furthermore, a voltage divider comprising the varistor is advantageously provided between the second potential node and the reference-ground potential node, wherein the voltage divider comprises at least one further varistor connected upstream and/or connected downstream of the varistor. When an overvoltage occurs, an ignition pulse is generated on the primary side of the transformer by way of connecting the spark gaps between the first and the second potential node in series with the RC element and a varistor. As a result, a high-voltage pulse is generated on the secondary side of the transformer, said high-voltage pulse being coupled in by means of capacitors, advantageously high-voltage capacitors, at some spark gaps between the second potential node and the reference-ground potential node of the multiple spark-gap arrester.

In various embodiments the multiple spark-gap arrester has arrester sections between the second potential node and the reference-ground potential node, each arrester section comprising at least one spark gap from the plurality of spark gaps. The secondary side is advantageously connected to potential nodes between the arrester sections by means of the capacitors. The voltage breakdown of the entire multiple spark-gap arrester is affected by the arrester sections being ignited one after another. The coupling-out of the ignition pulse and the generation of a high-voltage pulse by means of the transformer allow secure ignition of the arrester sections. Furthermore, the ignition of arrester section by arrester section reduces the number of capacitors required. It should still be noted that the arrester sections can also be recognizable in terms of design, for example, by integration of the spark gaps comprised by them, within the multiple spark-gap arrester.

In an alternative configuration, the secondary side is capacitively coupled to the arrester sections. The arrester sections have a body made of insulating material and the capacitive coupling is affected by means of a conductor that at least partially surrounds the body. The conductor can be configured as an insulated wire. Alternatively, the conductor can be of tubular design and an insulating film is provided between the conductor and the arrester section.

The capacitive coupling can be affected arrester section by arrester section. An RC element having a resistor connected in parallel with a capacitor is advantageously coupled between one of the potential nodes, which is between two adjacent arrester sections, and the reference-ground potential node. The capacitor also allows arresters that are difficult to ignite to be driven reliably at the arc burning voltage and the willingness of the arrangement to ignite to be increased. A spark gap is advantageously provided between the second potential node and the arrester sections and an RC element is coupled between the potential node, which is between the arrester sections and the spark gap, and the reference-ground node in order to facilitate the ignition of the spark gap section next to the second potential node.

BRIEF DESCRIPTION OF THE DRAWINGS

The invention is explained below on the basis of exemplary embodiments with reference to the drawings, wherein the figures of identical or identically acting constituent parts are in each case identified by the same reference symbols.

FIG. 2 shows a circuit arrangement of a second exemplary embodiment of a multiple spark-gap arrester.

DETAILED DESCRIPTION OF ILLUSTRATIVE EMBODIMENTS

Figure 1:
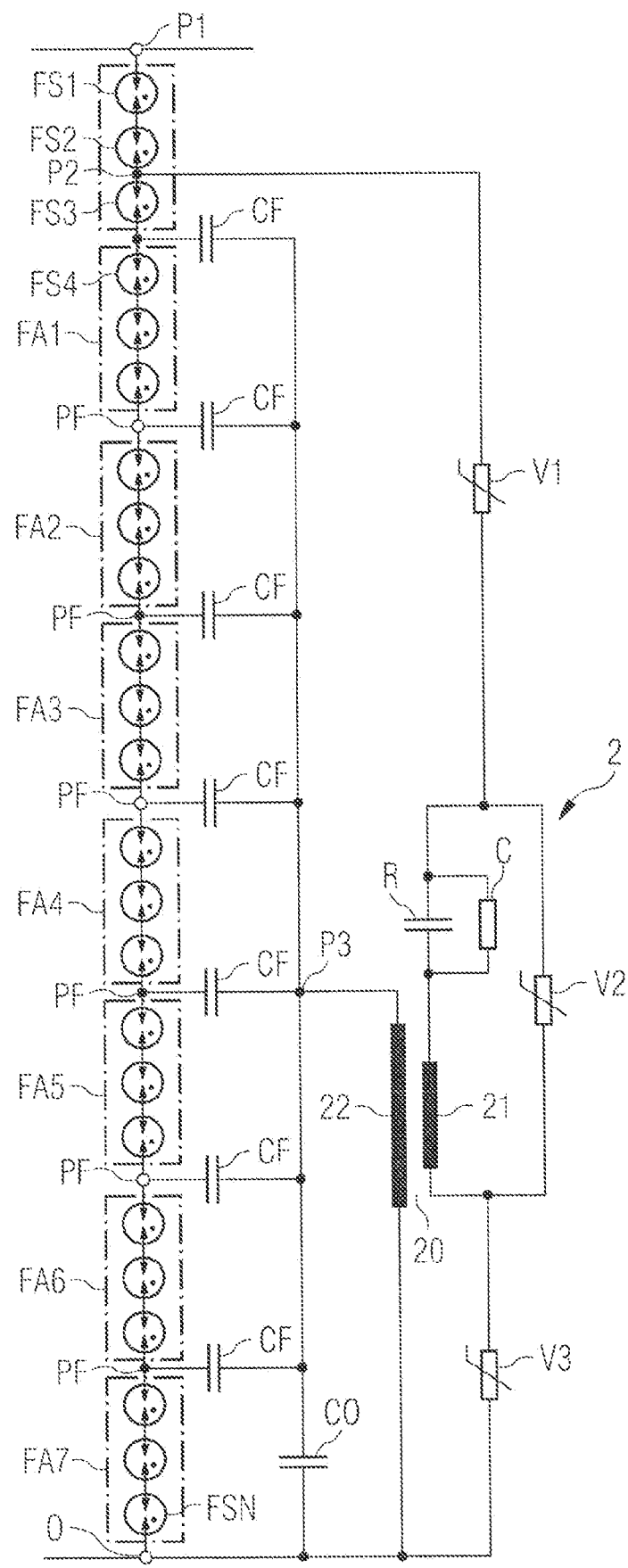
FIG. 1 shows a circuit arrangement of a first exemplary embodiment of a multiple spark-gap arrester.

The first exemplary embodiment of a multiple spark-gap arrester in FIG. 1 comprises a plurality of N spark gaps FS1-FSN, which are connected in series. A DC voltage can be applied to the series connection of spark gaps FS1-FSN via a first potential node P1 and a reference-ground potential node 0. In this exemplary embodiment, 24 spark gaps FS1-FSN are illustrated by way of example. Exemplary embodiments may have more or fewer spark gaps.

Furthermore, a trigger circuit 2 with a first, second and third varistor V1, V2, V3 in series, with an RC element having a resistor R connected in parallel with a capacitor C, and with a transformer 20 having a primary and a secondary side 21, 22 is provided. The input of the trigger circuit 2 is a second potential node P2 between two adjacent spark gaps FS2, FS3. In this exemplary embodiment, the trigger circuit 2 is tapped on the input side between the second and third spark gap FS2, FS3. The series connection of varistors V1, V2, V3 is coupled between the second potential node P2 and the reference-ground potential node 0. A series connection of the RC element and the primary side 21 of the transformer 20 is coupled in parallel with the second varistor V2.

The output of the trigger circuit 2 is a third potential node P3; the secondary side 22 is coupled between said third potential node and the reference-ground potential node 0. The third potential node P3 is coupled to the reference-ground potential node 0 by means of a capacitor CO. The third potential node P3 is furthermore coupled to potential nodes PF between spark gaps FS4-FSN by means of capacitors CF, said spark gaps themselves being coupled in series between the second potential node P2 and the reference-ground potential node 0. In this exemplary embodiment, in each case three spark gaps are provided between the potential nodes PF, said three spark gaps forming one of the arrester sections FA1-FA7. In other exemplary embodiments, more or fewer spark gaps may be provided in an arrester section. Arrester sections having a different number of spark gaps may be provided between the second potential node P2 and the reference-ground potential node 0. Exemplary embodiments having single spark gaps between two potential nodes PF are also possible.

In the circuit arrangement described, the first and second spark gap FS1, FS2, which are between the first and the second potential node P1, P2, serve to generate a trigger pulse by means of the trigger circuit 2 for the further spark gaps FS3-FSN. The further spark gaps FS3-FSN form an arrester protection path, the spark gaps FS3-FSN of which are ignited by a trigger pulse.

When a prescribed voltage between the first potential node P1 and the reference-ground potential node 0 is exceeded, the first and second spark gap FS1, FS2 between the first and the second potential node P1, P2 ignite first. The voltage at which ignition occurs is lower than that of a series connection of N spark gaps, since the voltage is determined by the spark gaps FS1, FS2 between the first and the second potential node P1, P2 and the varistor clamping voltages of the varistors V1, V2, V3. The sum of the varistor clamping voltages is lower than the sum of the arc burning voltages of the spark gaps FS3-FSN with which they are connected in parallel. As a result, providing the series-connected varistors V1, V2, V3 allows the ignition voltage of the multiple spark-gap arrester to be reduced and the selection of the varistor clamping voltages and the number of spark gaps between the first and the second potential node P1, P2 also allows the value of the ignition voltage to be set. In this exemplary embodiment, two spark gaps are between the first and the second potential node P1, P2 by way of example.

Upon ignition of the spark gaps FS1, FS2 between the first and the second potential node P1, P2, a current flows both via said spark gaps FS1, FS2 and via the varistors V1, V2, V3. While the current is flowing, the varistors V1, V2, V3 operate as voltage limiters up to the ignition of the arrester gaps. To protect the primary side 21 of the transformer 20, the varistor V2 limits the voltage arising there. Furthermore, the RC element affects a pulse on the primary side 21 of the transformer 20. As a result, a high-voltage pulse is generated on the secondary side 22 of the transformer 20, said high-voltage pulse serving to trigger the further spark gaps FS3-FSN. The capacitor CO serves for buffer storage of the high-voltage pulse.

The high-voltage pulse is applied to the nodes PF between the arrester sections FA1-FA7 by means of the capacitors CF connected downstream of the third potential node P3, said capacitors preferably being configured as high-voltage capacitors. The pulse height determines how many spark gaps are integrated in one of the arrester sections FA1-FA7 and how many can be ignited by the applied pulse. In this exemplary embodiment, the pulse height allows three spark gaps to be integrated. The entire multiple spark-gap arrester breaks down almost simultaneously, but as a function of the respective voltage drop across the arrester sections. The arrester section FA7 next to the reference-ground potential 0 thus ignites as the first, followed by the adjacent arrester section FA6, until gradually all the arrester sections FA5-FA1 up to the second potential node P2 have been ignited, with the result that all the spark gaps FS1-FSN of the multiple spark-gap arrester are conductive and short the overvoltage between the first potential node P1 and the reference-ground node 0. As soon as the voltage falls below the sum of the arc burning voltage, the spark is quenched and the multiple spark-gap arrester returns to its output state.

FIG. 2 shows a circuit arrangement of a second exemplary embodiment of a multiple spark-gap arrester. The following text deals only with the differences from the previous exemplary embodiment. In this exemplary embodiment, the multiple spark-gap arrester comprises 14 spark gaps FS1-

FSN, wherein the number is merely selected by way of example. In this exemplary embodiment, the trigger circuit 2 is tapped on the input side between the first and second spark gap FS1, FS2. The voltage divider comprises just two varistors V2 and V3.

The arrester protection path between the second spark gap FS2 and the reference-ground potential node 0 comprises four arrester sections FA1-FA4 each having three spark gaps. From the potential nodes PF between the arrester sections FA1-FA4, an RC element having a resistor R2, R3, R4 connected in parallel and a capacitor C2, C3, C4 is in each case coupled to the reference-ground potential node 0. An RC element having a resistor R1 connected in parallel with a capacitor C1 is also coupled between the potential node Px between the second spark gap FS2 and the first arrester section FA1 to the reference-ground potential node 0.

Said multiple spark-gap arrester is ignited capacitively by means of an external coupling of the high-voltage pulse of the secondary side 22 of the transformer 20, said coupling not being electrically connected to the spark gaps. As illustrated in FIG. 2, the coupling can be affected arrester section by arrester section. As is known from flash tubes, for example, the coupling can be affected by one insulating wire per arrester section. In this case, each insulated wire lies in a narrow loop around the arrester ceramic. For the purpose of simplification, said coupling can, however, also be carried out as follows: the multiple spark-gap arrester is provided, radially, with an insulating film and arranged in a preferably tubular metal body. The length of the tubular body corresponds to the height of the multiple spark-gap arrester. To prevent an external flashover on the end sides, the film has to protrude at both ends or alternative means that prevent flashover have to be provided. The metal body is electrically conductively connected to the secondary side 22 of the transformer 20. In order to drive even multiple spark-gap arresters that are difficult to ignite reliably at the arc burning voltage and to increase the willingness of the entire arrester gap to ignite, the four arrester sections FA1-FA4 are each interconnected with the capacitor C1, C2, C3, C4 within the RC elements. In order that the electrodes of the spark gaps located under the metal body can be contact-connected, the metal body has recesses. In one exemplary embodiment, the metal body is a tube with a wide slot, which permits access to the electrodes. Recesses in the film should also be provided for contact-connection. For a reliable function of the circuit, it is sufficient for the metal tube to enclose the circumference of the multiple spark-gap arrester only over approximately 330 degrees. If the metal tube is produced from flexible material, it can be snapped onto the multiple spark-gap arrester easily and in the process fixedly clamp the insulating film.

In the exemplary embodiment in FIG. 2, the ignition of the first spark gap FS1 leads to the generation of a high-voltage pulse on the secondary side 22. This process has already been described in connection with FIG. 1. The flow of current through the first and second spark gap FS1, FS2 also charges the capacitor C1 in the first RC element. In the case of capacitive ignition of the arrester section next to the second potential node P2, a charge flows from the capacitor C1 of the first RC element via the now ignited spark gaps of the first arrester section FA1 to the capacitor C2 of the second RC element. This flow of charge via the capacitors C2, C3, C4 continues gradually with the ignition of the second arrester section FA2, then the third arrester section FA3 and finally the fourth arrester section FA4.

A common feature of the exemplary embodiments is the fact that, after ignition of a few spark gaps, the ignition pulse is coupled out and is used, with the aid of a high-voltage transformer, to generate a high-voltage pulse. The high voltage generated brings about reliable ignition of the arrester sections of the multiple spark-gap arrester.

It should be noted that the features of the exemplary embodiments can be combined.

The invention claimed is:

1. A multiple spark-gap arrester comprising:
   a series connection of a plurality of spark gaps between a first potential node and a reference-ground potential node; and
   a trigger circuit having an input and an output, the input being coupled to a second potential node between two adjacent spark gaps of the plurality of spark gaps, and the output being coupled to at least one of the spark gaps between the second potential node and the reference-ground potential node,
   wherein the trigger circuit is configured, when at least one spark gap between the first potential node and the second potential node is ignited, to supply a trigger signal for the at least one of the spark gaps between the second potential node and the reference-ground potential node.

2. The multiple spark-gap arrester according to claim 1, wherein the trigger circuit comprises a transformer having a primary side coupled to the input and a secondary side coupled to the output.

3. The multiple spark-gap arrester according to claim 2, wherein the primary side is coupled in series with an RC element comprising a resistor connected in parallel with a capacitor.

4. The multiple spark-gap arrester according to claim 3, wherein a varistor is coupled in parallel with the series connection by the primary side and the RC element.

5. The multiple spark-gap arrester according to claim 4, wherein a voltage divider comprising the varistor is coupled between the second potential node and the reference-ground potential node.

6. The multiple spark-gap arrester according to claim 5, wherein the voltage divider comprises at least one further varistor connected upstream and/or connected downstream of the varistor.

7. The multiple spark-gap arrester according to claim 1, further comprising arrester sections between the second potential node and the reference-ground potential node, each arrester section comprising at least one spark gap from the plurality of spark gaps.

8. The multiple spark-gap arrester according to claim 7, wherein the output is coupled to a further potential node between two adjacent arrester sections by a capacitor.

9. The multiple spark-gap arrester according to claim 7, wherein the output is capacitively coupled to the arrester sections.

10. The multiple spark-gap arrester according to claim 9, wherein an RC element comprising a resistor connected in parallel with a capacitor is coupled between one of a plurality of further potential nodes, which is between two arrester sections, and the reference-ground potential node.

11. The multiple spark-gap arrester according to claim 10, wherein a spark gap from the plurality of spark gaps is coupled between the second potential node and the arrester sections and an RC element comprising a resistor connected in parallel with a capacitor is coupled between a further potential node, which is between the arrester sections and the spark gap, and the reference-ground potential node.

12. The multiple spark-gap arrester according to claim 9, wherein the arrester sections include a body comprising an insulating material and a capacitive coupling is affected by a conductor that at least partially surrounds the body.

13. The multiple spark-gap arrester according to claim 12, wherein the conductor is an insulated wire.

14. The multiple spark-gap arrester according to claim 12, wherein the conductor is of tubular design, and wherein an insulating film is provided between the conductor and an arrester section.

15. The multiple spark-gap arrester according to claim 14, wherein a tubular conductor extends at least along all the arrester sections.

* * * * *